US011942298B2

(12) United States Patent
Grunack et al.

(10) Patent No.: US 11,942,298 B2
(45) Date of Patent: Mar. 26, 2024

(54) SWITCHING DEVICE

(71) Applicant: TDK Electronics AG, Munich (DE)

(72) Inventors: Armin Grunack, Berlin (DE); Torsten Klinger, Radebeul (DE)

(73) Assignee: TDK Electronics AG, Munich (DE)

( * ) Notice: Subject to any disclaimer, the term of this patent is extended or adjusted under 35 U.S.C. 154(b) by 64 days.

(21) Appl. No.: 17/271,132

(22) PCT Filed: Aug. 16, 2019

(86) PCT No.: PCT/EP2019/072038

§ 371 (c)(1),
(2) Date: Feb. 24, 2021

(87) PCT Pub. No.: WO2020/043515

PCT Pub. Date: Mar. 5, 2020

(65) Prior Publication Data

US 2021/0249210 A1 Aug. 12, 2021

(30) Foreign Application Priority Data

Aug. 28, 2018 (DE) ......................... 102018120984.3

(51) Int. Cl.
*H01H 51/28* (2006.01)
*H01H 1/20* (2006.01)
*H01H 47/00* (2006.01)
*H01H 50/02* (2006.01)
*H01H 71/04* (2006.01)

(52) U.S. Cl.
CPC .............. *H01H 51/28* (2013.01); *H01H 1/20* (2013.01); *H01H 47/002* (2013.01); *H01H 50/023* (2013.01); *H01H 71/04* (2013.01); *H01H 2071/048* (2013.01)

(58) Field of Classification Search
CPC ........ H01H 51/28; H01H 1/20; H01H 47/002; H01H 50/023; H01H 71/04; H01H 2071/048; H01H 2050/025; H01H 2071/042
USPC .......................................................... 335/154
See application file for complete search history.

(56) References Cited

U.S. PATENT DOCUMENTS 1,166,951 A * 1/1916 Von Kramer et al. ........................ H01H 50/76 335/94
1,175,699 A * 3/1916 Brown ................... H01H 50/76 335/98
4,450,427 A 5/1984 Gareis
4,533,865 A * 8/1985 Schlenk ............... G01R 19/145 340/663

(Continued)

FOREIGN PATENT DOCUMENTS

CN 1402878 A 3/2003
CN 101261288 A * 9/2008

(Continued)

*Primary Examiner* — Mohamad A Musleh
*Assistant Examiner* — Lisa N Homza
(74) *Attorney, Agent, or Firm* — Slater Matsil, LLP

(57) ABSTRACT

In an embodiment, a switching device includes at least one stationary contact, a movable contact, an armature, a permanent magnet and a magnetically-operated switch, wherein the movable contact is movable by the armature, wherein the permanent magnet is attached to the armature, and wherein the magnetically-operated switch is a Hall switch.

19 Claims, 4 Drawing Sheets

(56) References Cited

U.S. PATENT DOCUMENTS

| | | | | | |
|---|---|---|---|---|---|
| 4,533,888 | A * | 8/1985 | Grenier | H02H 3/08 | 335/262 |
| 5,235,303 | A * | 8/1993 | Xiao | H01H 47/22 | 335/132 |
| 5,523,684 | A * | 6/1996 | Zimmermann | H01F 7/1844 | 324/207.2 |
| 5,861,787 | A * | 1/1999 | Graeber | H02H 3/003 | 335/154 |
| 7,569,785 | B2 * | 8/2009 | Mills | H01H 71/123 | 200/313 |
| 8,289,026 | B2 | 10/2012 | Keil et al. | | |
| 9,887,056 | B2 | 2/2018 | Lee | | |
| 10,141,143 | B2 * | 11/2018 | Bock | H02P 1/32 | |
| 10,333,512 | B2 | 6/2019 | Ugale et al. | | |
| 10,854,406 | B2 | 12/2020 | Bobert | | |
| 2004/0217832 | A1 * | 11/2004 | Lamb | E05B 85/26 | 335/205 |
| 2006/0044094 | A1 * | 3/2006 | Davis | A63H 33/26 | 335/220 |
| 2006/0254893 | A1 * | 11/2006 | Mills | H01H 71/123 | 200/313 |
| 2008/0284549 | A1 * | 11/2008 | Bedell | H03K 17/9502 | 335/170 |
| 2009/0189612 | A1 * | 7/2009 | Mills | H01H 71/128 | 324/424 |
| 2012/0068797 | A1 * | 3/2012 | Lauder | G06F 1/1656 | 29/428 |
| 2013/0335174 | A1 * | 12/2013 | Kodama | H01H 47/002 | 335/2 |
| 2016/0134224 | A1 * | 5/2016 | Bock | H01H 47/02 | 318/473 |
| 2017/0194956 | A1 * | 7/2017 | Ugale | H01H 47/002 | |
| 2019/0019643 | A1 * | 1/2019 | Bobert | H01H 51/065 | |
| 2023/0089840 | A1 * | 3/2023 | Wiegman | B60L 53/65 | 320/109 |

FOREIGN PATENT DOCUMENTS

| | | | |
|---|---|---|---|
| DE | 3209562 | A1 | 9/1983 |
| DE | 3308725 | A1 | 9/1984 |
| DE | 10227278 | A1 | 1/2004 |
| DE | 102007002176 | A1 | 7/2008 |
| DE | 102010043352 | A1 | 5/2012 |
| DE | 102016125571 | A1 | 7/2017 |
| KR | 20170009348 | A | 1/2017 |
| WO | 2017129823 | A1 | 8/2017 |

* cited by examiner

SWITCHING DEVICE

This patent application is a national phase filing under section 371 of PCT/EP2019/072038, filed Aug. 16,2019, which claims the priority of German patent application 102018120984.3, filed Aug. 28, 2018, each of which is incorporated herein by reference in its entirety.

TECHNICAL FIELD

A switching device is specified.

SUMMARY

The switching device is embodied in particular as a remotely operated, electromagnetically acting switch which can be operated by electrically conductive current. The switching device can be activated via a control current circuit and can switch a load current circuit. In particular, the switching device can be embodied as a relay or as a contactor, in particular as a power contactor. Particularly preferably, the switching device can be embodied as a gas-filled power contactor.

One possible application of such switching devices, in particular of power contactors, is to open and to disconnect battery current circuits, for example in motor vehicles such as electric or in part electrically driven motor vehicles. These motor vehicles can be for example purely battery-driven vehicles (BEV: "Battery Electric Vehicle"), hybrid electric vehicles that can be charged via a socket or a charging station (PHEV: "Plug-in Hybrid Electric Vehicle") and hybrid electric vehicles (HEV: "Hybrid Electric Vehicle"). In so doing, generally both the plus contact and also the minus contact of the battery are disconnected with the aid of a power contactor. This disconnection is performed in normal operation for example in the idle state of the vehicle and also in the event of a malfunction such as an accident or similar. Here, it is the main task of the power contactor to disconnect the power supply to the vehicle and to interrupt the current flow.

A particularly serious malfunction that can occur in the case of such a switch is a so-called "stuck". In this case switching elements "become stuck" as a result of becoming welded during a switching-off or switching-on with the result that even if the supply voltage of the switch has been switched off, it is not possible to ensure that the load current circuit has been safely disconnected. When using power contactors in circuits having extremely dangerous voltages, it is therefore expedient for safety reasons to detect the switched position with the result that in the event of a stuck contactor it is possible using suitable measures to react to this malfunction.

One possibility of detecting the switching position is to use a separate switching element, in particular a micro switch, which is actuated simultaneously by way of a mechanical coupling to the main switch contact by means of the switching movement of said main switch contact. However, such a micro switch as with any mechanical switch is subject to the usual signs of wear. Another possibility is to use a reed switch that is switched by way of a magnet that is simultaneously moved with the switching movement of the power contactor, which causes the magnet to move closer and further away relative to the reed switch. However, a reed switch depending upon its type of construction also reacts to any sufficiently strong magnetic or electromagnetic field in its environment.

Embodiments provide a switching device, particularly preferably a switching device that can prevent or at least reduce the described disadvantages.

In accordance with at least one embodiment, a switching device comprises at least one stationary contact and at least one movable contact. The at least one stationary contact and the at least one movable contact are intended and embodied to switch on and off a load current circuit that can be connected to the switching device. The movable contact can be moved in the switching device accordingly between a non-connected state, also referred to below as a non-active or switched-off state, and a connected state of the switching device, also referred to below as an active or switched-on state, in such a manner that in the case of a non-connected state of the switching device the movable contact is at a distance from at least one stationary contact and consequently is galvanically isolated and in the connected state comprises a mechanical contact for at least one stationary contact and is consequently galvanically connected to the at least one stationary contact. The statement that the switching device comprises at least one stationary contact can particularly preferably also mean that the switching device comprises at least two stationary contacts that are arranged separately from one another in the switching device and that by means of the movable contact in the described manner can be connected to one another in an electrically conductive manner or can be electrically disconnected from one another depending upon the state of the movable contact. Parts of the description that relate to at least one stationary contact also apply in a similar manner for multiple and in particular all stationary contacts that are provided in the switching device.

The at least one stationary contact and/or the at least one movable contact can for example comprise or be embodied from Cu, a Cu alloy, one or multiple high melting point metals such as for example W, Ni and/or Cr or a mixture of said materials, for example of copper comprising at least a further metal, for example W, Ni and/or Cr.

In accordance with a further embodiment, the switching device comprises a housing in which the movable contact and the at least one stationary contact are arranged. The movable contact can be arranged in particular fully in the housing. The statement that a stationary contact is arranged in the housing can mean in particular that the contact region of the stationary contact, which in the connected state is in mechanical contact with the movable contact, is arranged within the housing. In order to connect a supply line of a current circuit that is to be switched by means of the switching device, a stationary contact that is arranged in the housing can be electrically contacted from outside, in other words from outside the housing. For this purpose, a stationary contact that is arranged in the housing can protrude with a part out of the housing and comprise outside the housing a terminal facility for a supply line.

In accordance with a further embodiment, the switching device comprises a switching chamber in which the movable contact and the at least one stationary contact are arranged. The switching chamber can be arranged in particular in the housing. The movable contact can be arranged particularly preferably fully in the switching chamber. The statement that a stationary contact is arranged in the switching chamber can mean in particular that at least one contact region of the stationary contact, which in the connected state is in mechanical contact with the movable contact, is arranged within the switching chamber. In order to connect a supply line of a current circuit that is to be switched by means of the switching device, a stationary contact that is arranged in the switching chamber can be electrically contacted from outside, in other words from outside the switching chamber. For this purpose, a stationary contact that is arranged in the switching chamber can protrude with a part out of the switching chamber and comprise outside the switching chamber a terminal facility for a supply line.

In accordance with a further embodiment, the movable contact can be moved by means of an armature. The armature can comprise for this purpose a shaft that is connected at one end to the movable contact in such a manner that the movable contact can be moved by means of the shaft, in other words as the shaft moves so does the movable contact as a result. The shaft can protrude in particular through an opening in the switching chamber. In particular, the switching chamber can comprise a switching chamber base that comprises an opening through which the shaft protrudes. The armature can be moved through a magnetic circuit in order to bring about the switching procedures described above. For this purpose, the magnetic circuit can comprise a yoke that comprises an opening through which the shaft of the armature protrudes. Furthermore, the armature can comprise a magnetic core that can be attached to an end of the shaft that lies opposite the movable contact and is the part of the magnetic circuit. It is possible by means of a coil that can be connected to a control current circuit to generate a magnetic field in the magnetic circuit by means of which the armature is moved.

The shaft can preferably comprise high-grade steel or be embodied therefrom. The yoke and/or the magnetic core can preferably comprise pure iron or a low doped iron alloy or be embodied therefrom. The switching chamber, in other words in particular the switching chamber wall and/or the switching chamber base, can comprise at least in part preferably a metal oxide ceramic material, such as for example $Al_2O_3$ or a synthetic material, or can be embodied therefrom. In particular synthetic materials that have sufficient temperature stability are suitable as synthetic materials. For example, the switching chamber can comprise as a synthetic material polyether ether ketone (PEEK), a polyethylene (PE) and/or glass-filled polybutylene terephthalate (PBT). Furthermore, the switching chamber can comprise at least in part also a polyoxymethylene (POM), in particular having the structure $(CH_2O)_n$.

In accordance with a further embodiment, the contacts are arranged in a gas atmosphere. This can in particular mean that the movable contact is arranged fully in the gas atmosphere and that furthermore at least a part of the at least one stationary contact, approximately the contact region of the at least one stationary contact, is arranged in the gas atmosphere. The switching device can comprise for this purpose a gas-tight region in which the gas atmosphere is hermetically sealed with respect to the environment and in which the described components can be arranged. The gas-tight region can be formed by means of parts of the housing and/or by means of additional walls and/or by means of components within the housing. For example, the gas-tight region can be formed by means of parts of the switching chamber wall and of the yoke in combination with additional wall parts, for example comprising or embodied from aluminum or high-grade steel. In particular, the switching chamber can be arranged in the gas-tight region of the switching device. Furthermore, the armature can also be arranged fully within the gas-tight region. It is particularly preferred that the switching device can accordingly be a gas-filled switching device such as a gas-filled contactor. The gas atmosphere can promote in particular the procedure of extinguishing flashovers that can occur between the contacts during the switching procedures. The gas of the gas atmosphere can comprise preferably a portion of at least 50% $H_2$. In addition to hydrogen, the gas can comprise an inert gas, particularly preferably $N_2$ and/or one or more noble gases. Furthermore, in particular the gas, in other words at least a part of the gas atmosphere, can be in the switching chamber.

In accordance with a further embodiment, the switching device comprises a magnetically-operated switch, in other words a switch, which can be switched back and forth between different states as a result of the influence of an external magnetic field. The magnetically-operated switch can comprise in particular a first state and a second state and it can switch between said states as a result of the influence of an external magnetic field. It is particularly preferred that the magnetically-operated switch can comprise precisely two states. In particular, the magnetically-operated switch can be an electronically active component, in other words a component which in order to be operated, in other words in particular switched, requires an operating voltage to be provided, whereas the magnetically-operated switch is not operable if the operating voltage is switched off or is absent. The ability of the magnetically-operated switch to be switched as described in the preceding and following text therefore always relates to a magnetically-operated switch that is connected to an operating voltage. Accordingly, during operation in dependence upon a magnetic field the magnetically-operated switch can be in a state preferably selected from a first state and a second state.

In accordance with a further embodiment, the magnetically-operated switch is a Hall switch. The Hall switch can comprise for example a switching circuit or be formed thereby, which comprises a Hall sensor having a sensitive surface. The Hall sensor can be configured and connected in the switching circuit in such a manner that if magnetic field lines of a magnetic field at the site of the Hall switch penetrate the sensitive surface of the Hall sensor, a Hall voltage proportional to the perpendicular component of the field lines is generated. It is possible by means of a comparator in the switching circuit to compare the Hall voltage with a reference voltage. If the Hall voltage and accordingly the magnetic field lie below a specified threshold value, an output of the switching circuit and consequently of the Hall switch can be held in a first state. In other words, the Hall switch is in the first state if the magnetic field is less than a threshold magnetic field. If the Hall voltage and accordingly the magnetic field exceed the threshold value, the output can be switched into the second state. Accordingly, the Hall switch is then in the second state if the magnetic field is stronger than the threshold magnetic field.

A magnetic field that is described in connection with the Hall switch, even though not explicitly described, can always refer to the magnetic field that is prevailing at the site of the Hall switch. Furthermore, it is possible in the preceding and following text with respect to the operating principle of the Hall switch for the term “magnetic field” or “threshold magnetic field” to describe in particular the component of the field which is perpendicular to the sensitive surface of the Hall switch, which penetrates the sensitive surface.

In accordance with a further embodiment, the switching device comprises a permanent magnet. The permanent magnet can be in particular attached to the armature. Together with the contacts of the switching device and the armature, the permanent magnet can thus be arranged within the gas-tight region. In particular, the permanent magnet can be arranged on an end of the armature that is remote from the movable contact. For example, the permanent magnet can be attached to the magnetic core and/or to the shaft of the armature. The permanent magnet can be a rod magnet or a disc magnetic or a ring magnet. It is particularly preferred that the permanent magnet can be a ring magnet that is arranged symmetrically with respect to the shaft of the armature.

By virtue of the fact that the permanent magnet is attached to the armature, the permanent magnet can be moved simultaneously as a result of the switching movement of the armature as the switching device is switched. The magnetically-operated switch and the permanent magnet can be arranged in particular in such a manner with respect to one another that the magnetic field that is generated by the permanent magnet at the site of the magnetically-operated switch in the case of the switched-on state of the switching device is weaker than in the case of the switched-off state of the switching device. Along the movement direction of the armature, the magnetically-operated switch can be arranged for example below the permanent magnet, in other words on the end of the armature to which the permanent magnet is attached. In particular, the magnetically-operated switch can be arranged along an imaginary extension of the shaft of the armature in the middle or slightly offset thereto below the armature and the permanent magnet. In the case of the switched-on state of the switching device, the permanent magnet can be at a greater distance from the magnetically-operated switch than in the case of the switched-off state of the switching device.

In accordance with a further embodiment, during operation in dependence upon the distance the permanent magnet is from the magnetically-operated switch, the magnetically-operated switch is in the first state or in the second state. It is particularly preferred that the permanent magnet is arranged in such a manner that the permanent magnet comprises a magnetic pole, for example the magnetic south pole, on one side that is facing the magnetically-operated switch. The magnetically-operated switch can be embodied and arranged in such a manner that in dependence upon a distance from the said magnetic pole the magnetically-operated switch is in the first state or in the second state. In particular, the magnetically-operated switch and the permanent magnet can be embodied and arranged in such a manner that even during an operation of the coil of the switching device, by means of which the armature and consequently the movable contact are moved, the magnetically-operated switch remains in the state produced by means of the permanent magnet irrespective of stray fields that are triggered by means of the coil at the site of the magnetically-operated switch. If the switching device is in the non-active state, the permanent magnet can be at a shorter distance from the magnetic sensor than for the case that the switching device is in the active state. Accordingly, as a mere example the magnetically-operated switch can be in the first state if the switching device is in the non-active state, and in the second state if the switching device is in the active state.

In accordance with a further embodiment, the magnetically-operated switch in the first state generates a first current and in the second state generates a second current which is different to the first current. The output of the magnetically-operated switch can consequently preferably be a current output. As a mere example, the first current can be less than the second current.

In accordance with a further embodiment, the switching device comprises a signal processing device, and the magnetically-operated switch is connected to the signal processing device. The signal processing device can preferably be arranged together with the magnetically-operated switch in the housing. For example, the signal processing device can be attached together with the magnetically-operated switch to a part of the housing and/or within the housing. For example, the magnetically-operated switch and the signal processing device can be arranged on a common printed circuit board and connected to one another, said printed circuit board being arranged in the housing of the switching device. In particular, the signal processing device and the magnetically-operated switch can be arranged outside the gas-tight region. As a consequence, it is possible to make contact with the magnetically-operated switch and the signal processing device in a simple manner.

In accordance with a further embodiment, the signal processing device comprises a measuring resistor which is connected in series to the magnetically-operated switch. In other words, the measuring resistor can be connected to the output of the magnetically-operated switch. Since the magnetically-operated switch depending upon its state as described above generates a first current or a second current, the voltage drop at the measuring resistor depends upon the state of the magnetically-operated switch and consequently upon the position of the permanent magnet relative to the magnetically-operated switch. By virtue of the fact that the permanent magnet is attached to the armature, it is consequently possible with the aid of a voltage measurement at the measuring resistor to conclude the switched state of the switching device.

In accordance with a further embodiment, the signal processing device comprises a comparator that compares the voltage drop across the measuring resistor with a reference voltage. The reference voltage can for example be predetermined by means of a Zener diode that is connected to a voltage supply via a resistor parallel to the magnetically-operated switch. The comparator can comprise an operational amplifier or such an amplifier. In particular, the magnetically-operated switch, the Zener diode and the comparator can be connected to a common voltage supply and be connected during operation. The voltage supply can preferably be a voltage that is greater than or equal to 3 V and less than or equal to 24 V. For example, the voltage that is provided by the voltage supply is an onboard network voltage of a motor vehicle that can be 12 V or 24 V. It has been shown that the signal processing device can be designed with respect to its components in such a manner that the operational amplifier can be operated with the same supply voltage to ground as the magnetically-operated switch and the reference branch having the Zener diode, even if the operational amplifier is operated according to the specification at a usual supply voltage of +/−15 V.

The comparator can comprise an output that in dependence upon the voltage at the measuring resistor can assume different states in comparison to the reference voltage. In particular, the output of the comparator can assume a number of states according to the number of states of the magnetically-operated switch and consequently according to the number of states of the voltage at the measuring resistor. Furthermore, the signal processing device can comprise an electronic switch having a control input that is connected to the output of the comparator. The electronic switch can be for example a transistor, in particular a field effect transistor. It is particularly preferred that the control input of the electronic switch can be connected to the output of the comparator via a voltage divider. The voltage divider can be embodied in such a manner that with respect to the preferred two states of the magnetically-operated switch an unambiguous high signal and low signal is generated for the control input of the electronic switch.

The components described above of the signal processing device can be configured together with the magnetically-operated switch in such a manner that the electronic switch is in an open, in other words blocking, state, if the switching device is in the non-active switched state. Furthermore, the signal processing device and the magnetically-operated switch can be configured in such a manner that the electronic switch is in a closed, in other words conducting, state if the switching device is in the active switched state. In other words, it is preferred that the electronic switch is open or at least exhibits a high resistance if the load current circuit is open at the contacts of the switching device, and closed or at least exhibits a low resistance if the load current circuit is closed at the contacts of the switching device.

In the case of the switching device described here, it is consequently possible to detect the state of the contacts of the switching device, in other words open or closed, from the state of the magnetically-operated switch or from the state of the electronic switch of the signal processing device. As a consequence, a stuck contactor can also be clearly identified. Since in contrast to a method using a mechanical switch the state of the switching device is detected in an electronic manner, the detection method is resistant to vibrations and other mechanical influences on the switching device. By virtue of using a Hall switch in contrast to a simple Hall sensor, the influence of magnetic interference fields can be considerably reduced.

BRIEF DESCRIPTION OF THE DRAWINGS

Further advantages, advantageous embodiments and developments are apparent from the exemplary embodiments described below in connection with the figures.

In the drawings.

Figure 1A:
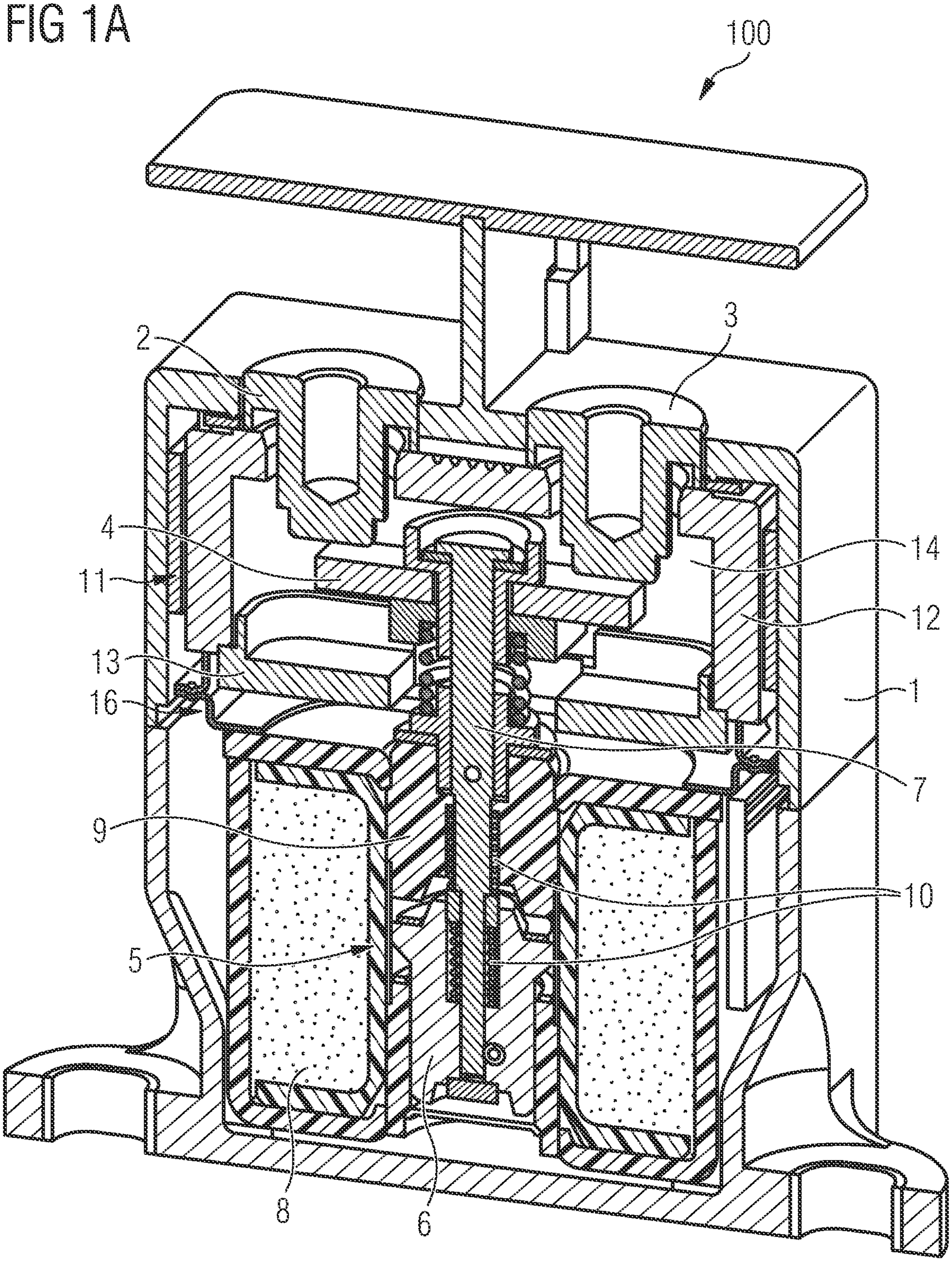
FIGS. 1A and 1B show schematic illustrations of an example for a switching device.

In the exemplary embodiments and figures, identical, similar or identically-functioning elements can be provided in each case with the same reference numerals. The illustrated elements and their size ratios with respect to one another are not to be regarded as being true to scale, on the contrary individual elements, such as for example, layers, components, structural elements and regions can be illustrated in an excessively large manner in order to improve the presentability and/or to improve the understanding of the invention.

DETAILED DESCRIPTION OF ILLUSTRATIVE EMBODIMENTS

Figure 1B:
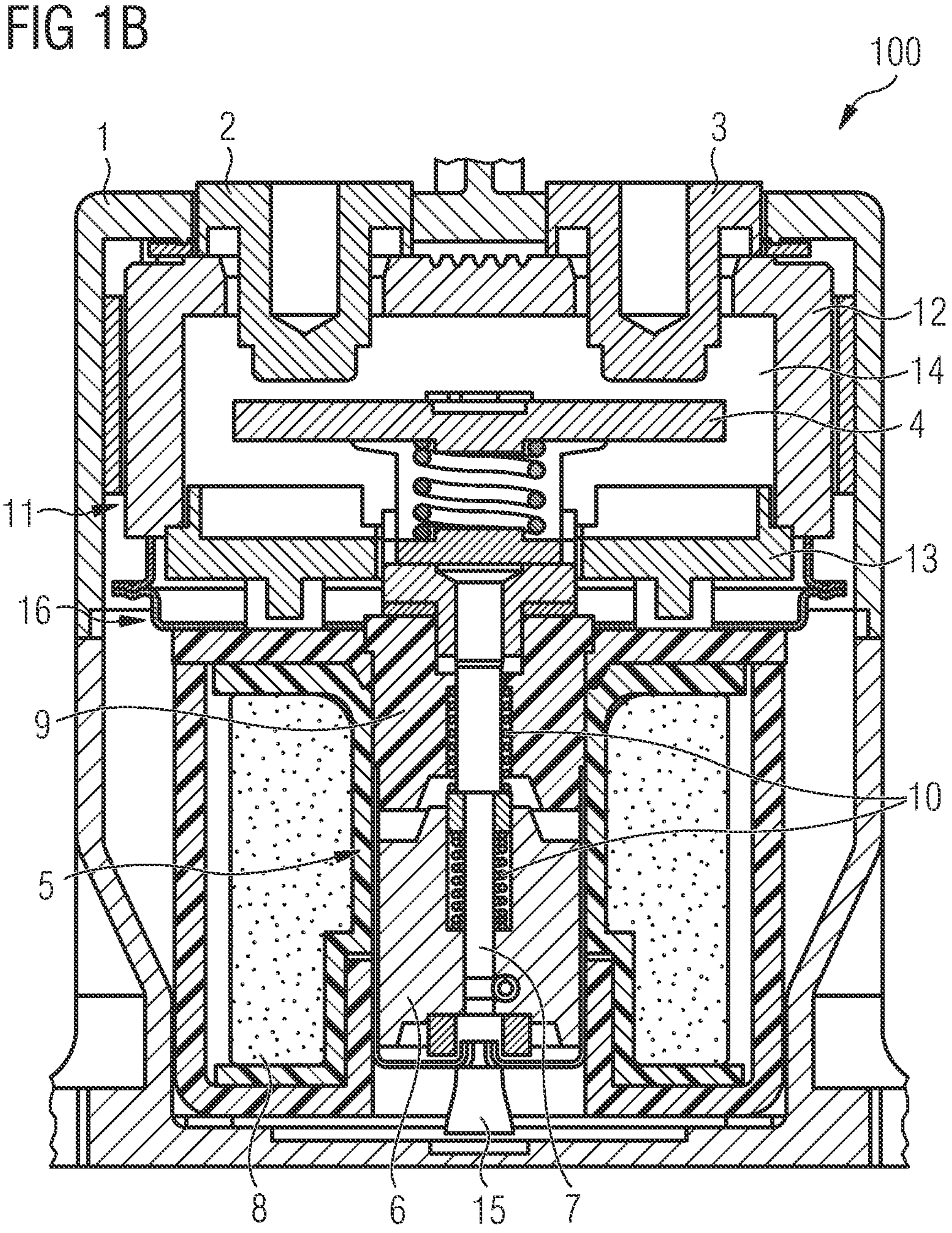

FIGS. 1A and 1B illustrate a switching device 100 that can be used for example to switch strong electrical currents and/or high electrical voltages and can be a relay or a contactor, for example a power contactor. FIG. 1A illustrates a three-dimensional sectional view, whereas FIG. 1B illustrates a two-dimensional sectional view. The description below relates equally to FIGS. 1A and 1B. The different geometries are only exemplary and not to be understood as limiting and can also be embodied in an alternative manner.

The switching device wo comprises in a housing 1 two stationary contacts 2, 3 and a movable contact 4. The movable contact 4 is embodied as a contact plate. The stationary contacts 2, 3 together with the movable contact 4 form the switching contacts. Alternatively to the illustrated number of contacts, other numbers of stationary and/or movable contacts are also possible. The housing 1 is used primarily as a contact protection for the components that are arranged inside and comprises or is embodied from a synthetic material, for example PBT or glass fiber-filled PBT. The contacts 2, 3, 4 can for example comprise or be embodied from Cu, a Cu alloy, or a mixture of copper comprising at least one further metal, for example W, Ni and/or Cr.

Figures 1A and 1B illustrate the switching device wo in an idle state in which the movable contact 4 is at a distance from the stationary contacts 2, 3 with the result that the contacts 2, 3, 4 are galvanically separated from one another. The illustrated design of the switching contacts and in particular their geometries are to be understood as a mere example and not as limiting. Alternatively, the switching contacts can also be embodied differently. For example, it can be possible that only one of the switching contacts is embodied in a stationary manner.

The switching device wo comprises a movable armature 5 that fundamentally performs the switching movement. The armature 5 comprises a magnetic core 6, for example comprising or embodied from a ferromagnetic material. Furthermore, the armature 5 comprises a shaft 7 that is guided through the magnetic core 6 and is fixedly connected at one shaft end to the magnetic core 6. At the other shaft end that lies opposite the magnetic core 6, the armature 5 comprises the movable contact 4 that is likewise connected to the shaft 7. The shaft 7 can preferably be manufactured comprising or embodied from high-grade steel.

The magnetic core 6 is surrounded by a coil 8. A current flow in the coil 8 which can be switched on from the outside by means of a control current circuit generates a movement of the magnetic core 6 and consequently of the entire armature 5 in the axial direction, until the movable contact 4 contacts the stationary contacts 2, 3. In the illustrated view, the armature moves upwards. The armature 5 consequently moves from a first position, which corresponds to the illustrated idle position and simultaneously the separated state, in other words non-conducting and thus switched-off state, into a second position that corresponds to the active, in other words conducting and thus switched-on, state. In the active state, the contacts 2, 3, 4 are connected to one another in a galvanic manner. In a different embodiment, the armature 5 can alternatively also perform a rotational movement. The armature 5 can be embodied in particular as a pulling armature or a folding armature. If the current flow in the coil 8 is interrupted, the armature 5 is moved by means of one or multiple springs 10 back into the first position. In the illustrated view, the armature 5 consequently moves back downwards. The switching device wo is then located back in the idle state in which the contacts 2, 3, 4 are open.

As the contacts 2, 3, 4 open, it is possible for a flashover to occur which can damage the contact surfaces. As a consequence, there is the risk that the contacts 2, 3, 4 remain "stuck" to one another by virtue of becoming welded as a result of the flashover and can no longer be separated from one another. Consequently, the switching device is then in the switched-on state although the current in the coil is switched off and consequently the load current circuit must have been separated. In order to prevent flashovers of this type occurring or in order at least to support the procedure of extinguishing flashovers that occur, the contacts 2, 3, 4 are arranged in a gas atmosphere with the result that the switching device wo is embodied as a gas-filled relay or gas-filled contactor. For this purpose, the contacts 2, 3, 4 are arranged in a switching chamber 11, which is formed by means of a switching chamber wall 12 and a switching chamber base 13, in a gas-tight region 16 that is formed by means of a hermetically sealed part. The gas-tight region 16 completely surrounds the armature 5 and the contacts 2, 3, 4 apart from parts of the stationary contacts 2, 3 that are provided for the external terminal. The gas-tight region 16 and consequently also the switching chamber 11 are filled with a gas 14. The gas-tight region 16 is formed fundamentally by means of parts of the switching chamber 11, of the yoke 9 and additional walls. The gas 14 that can be filled into the gas-tight region 16 by means of a gas-filling port 15 within the scope of producing the switching device 100 can particularly preferably contain hydrogen, for example with 50% or more $H_2$ in an inert gas or even with 100% $H_2$, since hydrogen-containing gas can promote the procedure of extinguishing flashovers. Furthermore, so-called blowout magnets (not illustrated) can be provided inside or outside the switching chamber 11, in other words permanent magnets that extend the flashover path and consequently can improve the procedure of extinguishing the flashovers. The switching chamber wall 12 and the switching chamber base 13 can be manufactured for example comprising or embodied from a metal oxide such as $Al_2O_3$. Furthermore, synthetic materials that have sufficiently high temperature stability are suitable, for example a PEEK, a PE and/or a glass-filled PBT. Alternatively or in addition, the switching chamber 11 can comprise at least in part also a POM, in particular having the structure $(CH_2O)_n$.

Figure 2:
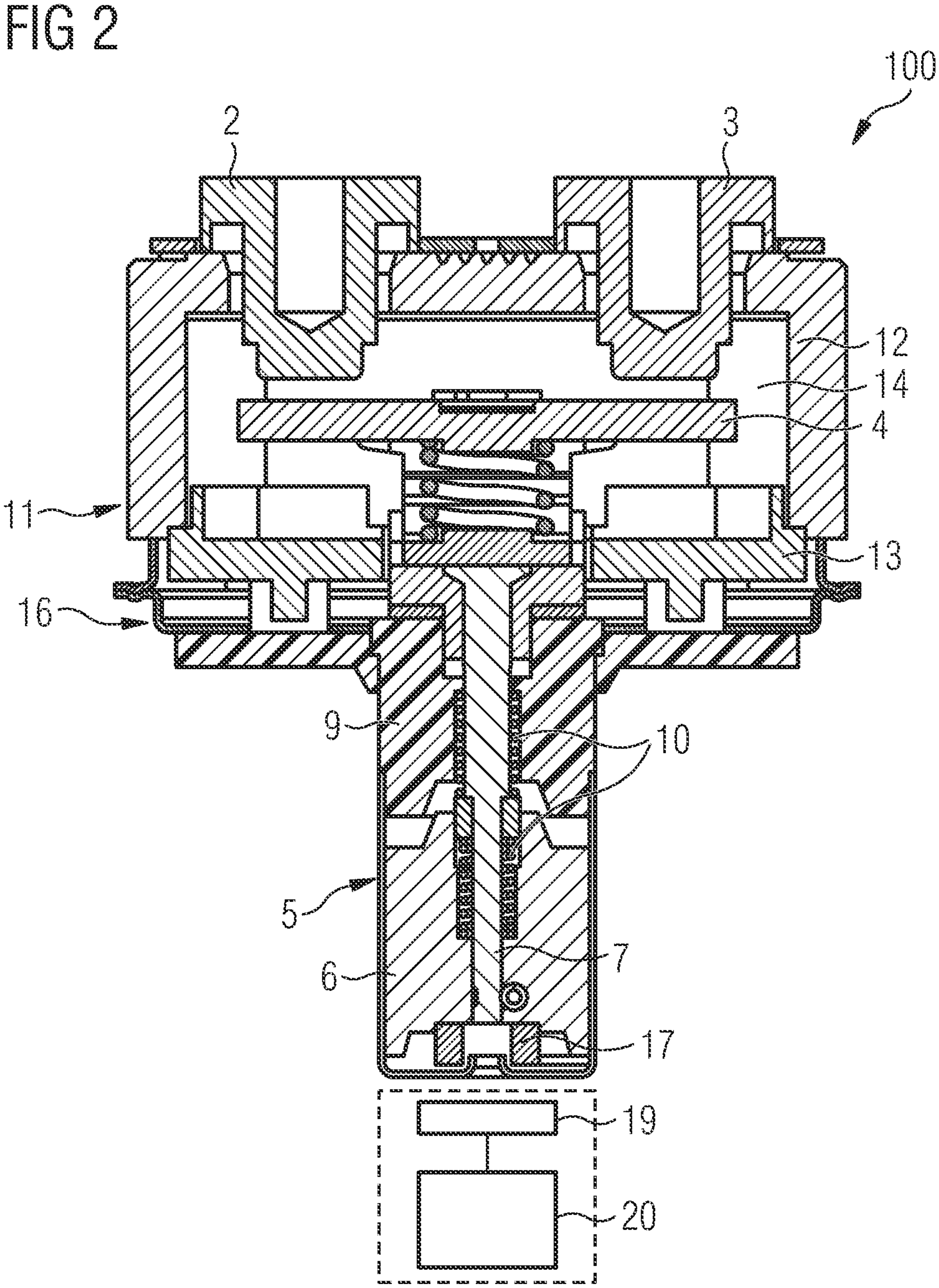
FIG. 2 shows a schematic illustration of a part of the switching device in accordance with an exemplary embodiment.
Figure 3A:
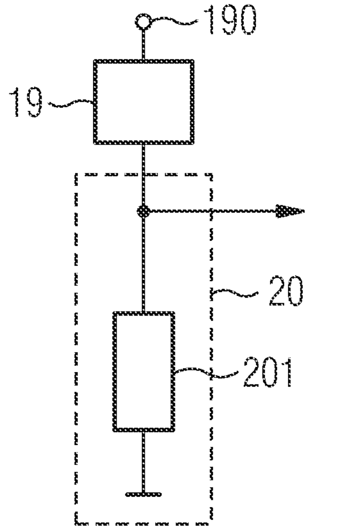
FIGS. 3A to 3C show schematic illustrations of signal processing devices and parts thereof in accordance with further exemplary embodiments.
Figure 3B:
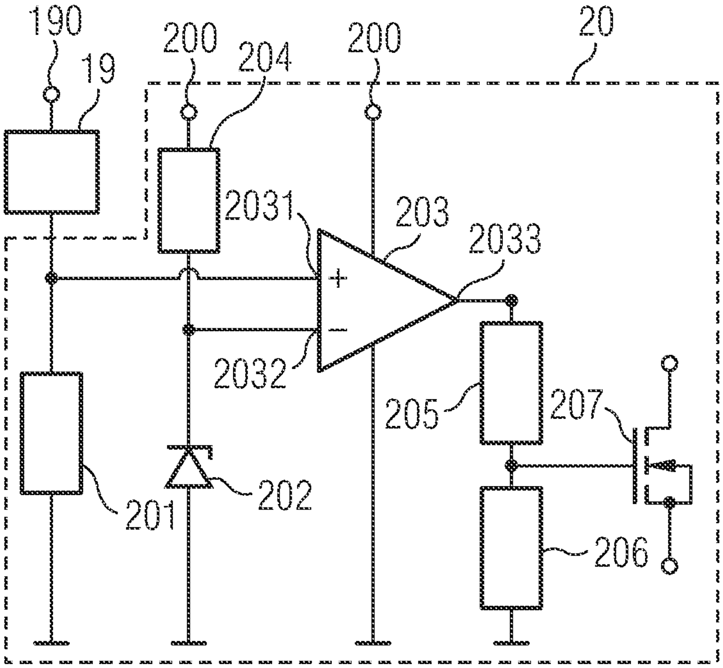
Figure 3C:
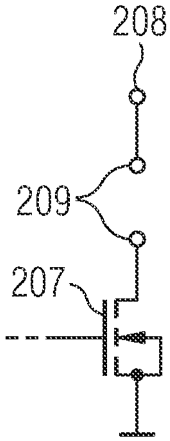

In order to obtain information regarding the actual position of the movable contact 4 and consequently for example with regard to a possible stuck contactor, the switching device 100 comprises further components that for the sake of clarity are not illustrated in figures 1A and 1B and are described in connection with FIGS. 2 and 3A to 3C. The switching device 100 comprises in particular furthermore a permanent magnet 17 and a magnetically-operated switch 19. Furthermore, the switching device wo comprises in the illustrated exemplary embodiment a signal processing device 20. Alternatively thereto, the switching device in accordance with a further embodiment can also not comprise a signal processing device. Fundamentally only the components and parts of the switching device 100 that are shown in figures 1A and 1B and form the gas-tight region 16 of the switching device 100 are illustrated in FIG. 2. Exemplary embodiments for the signal processing device 20 and parts thereof are illustrated in FIGS. 3A to 3C. Insofar as not otherwise described, the components and parts illustrated in FIG. 2 and also components and parts of the switching device 100 not illustrated in FIG. 2 in comparison to the figures 1A and 1B correspond to components and parts that are described in connection with FIGS. 1A and 1B.

The permanent magnet 17 is arranged together with the contacts 2, 3, 4 and the armature 5 within the gas-tight region 16 and is in particular attached thereto at the end of the armature 5 that is remote from the movable contact 4. As a consequence, the permanent magnet 17 can be moved by means of the armature 5 jointly with the movable contact 4.

As illustrated in FIG. 2, the permanent magnet 17 can be embodied as a ring magnet and can be attached to the magnetic core 6 of the armature 5. Alternatively thereto, the permanent magnet 17 can also be embodied as a rod magnet or disc magnet and alternatively or in addition also be attached to the shaft 7. Alternatively to the illustrated arrangement of the permanent magnet 17 in a symmetrical manner with regard to the shaft 7, the permanent magnet 17 can also be arranged and attached at a different position, in particular if as a consequence the functionality described below together with the magnetically-operated switch 19 can be improved.

The magnetically-operated switch 19 is arranged together with the signal processing device 20 outside the gas-tight region 16 within the housing (not illustrated in FIG. 2) of the switching device 100. It is particularly preferred that the magnetically-operated switch 19 and the signal processing device 20 can be connected to one another and furthermore can be arranged on a common printed circuit board, as indicated by the broken line in FIG. 2.

The magnetically-operated switch 19 is a Hall switch as described above in the general part and comprises a current output which depending upon the state of the Hall switch is provided with a first current or a second current. In particular, the magnetically-operated switch 19 is embodied as a Hall switch that is sensitive to the magnetic south pole of the permanent magnet 17 that is arranged accordingly with its south pole facing the magnetically-operated switch 19. According to the operating principle described above in the general part, the magnetically-operated switch 19 is otherwise relatively insensitive to interference fields. For the operation of the magnetically-operated switch 19, said magnetically-operated switch is permanently connected to a voltage supply (not illustrated) at least during the period of use of the switching device 100, as is described in detail in connection with FIGS. 3A to 3C.

By virtue of the fact that the permanent magnet 17 is attached to the armature 5, the permanent magnet 17 can be moved as described above simultaneously as a result of the switching movement of the armature 5 as the switching device 100 is switched, and as the switching device 100 is switched on into its active switched state said permanent magnet is moved away from the magnetically-operated switch 19 and as the switching device 100 is switched off into its non-active switched state said permanent magnet is moved back toward said magnetically-operated switch 19 with the result that in the case of the switched-on state of the switching device 100 the permanent magnet 17 is at a greater distance from the magnetically-operated switch 19 than in the case of the switched-off state of the switching device 100. Accordingly, the magnetic field that is generated by the permanent magnet 17 at the site of the magnetically-operated switch 19 in the case of the switched-on state of the switching device 100 is weaker than in the case of the switched-off state of the switching device 100. In particular, in the case of the switched-off state of the switching device loo, a first magnetic field strength that is produced by means of the permanent magnet 17 prevails at the site of the magnetically-operated switch 19 and in the case of the switched-on state of the switching device 100 a second magnetic field prevails, wherein the magnetic field strength as described above in the general part relates in particular to the component of the prevailing magnetic field which the magnetically-operated switch is sensitive to.

The magnetically-operated switch 19 is configured and dimensioned in such a manner that during operation in dependence upon a distance the permanent magnet 17 is from the magnetically-operated switch 19, the magnetically-operated switch 19 is in a first state or in a second state. This means in other words that in the case of the switched-off state of the switching device 100 the magnetic field produced by means of the permanent magnet 17 at the site of the magnetically-operated switch 19 is stronger than a threshold magnetic field and in the case of the switched-on state of the switching device 100 is less than a threshold magnetic field, wherein the threshold magnetic field indicates the magnetic field strength that is detected by the magnetically-operated switch, at which the magnetically-operated switch 19 switches from the first state into the second state or conversely. Merely as an example, the state in which the magnetically-operated switch 19 is in the case of the switched-off state of the switching device 100, in other words if the permanent magnet 17 is at a small distance from the magnetically-operated switch 19, is referred to as the first state of the magnetically-operated switch 19, whereas the state in which the magnetically-operated switch 19 in the case of the switched-on state of the switching device 100, in other words if the permanent magnet 17 is at a great distance from the magnetically-operated switch 19, is referred to as the second state. The magnetically-operated switch 19 generates in the first state a first current and in the second state a second current that is different to the first current. The magnetically-operated switch 19 can be embodied particularly preferably in such a manner that if the switching device 100 is switched off, the first current is less than the second current if the switching device 100 is switched on. For example, the first current can be in the range of 5 to 7 mA and the second current can be in the range of 12 to 17 mA.

By virtue of detecting the state of the magnetically-operated switch 19, in other words for example as a result of a current measurement at the output of the magnetically-operated switch 19, it is consequently possible to directly detect the state of the switching device 100. In particular, it is possible in a simple manner to detect if the switching device wo is still in the active state due to a stuck contactor although the current for the coil that moves the armature 5 has already been switched off and the switching device wo would accordingly have to be in the non-active state.

As previously mentioned, the switching device wo in accordance with the illustrated exemplary embodiment comprises furthermore a signal processing device 20 that is connected to the magnetically-operated switch 19. The signal processing device 20 can be provided and configured in particular for measuring the current that is generated by the magnetically-operated switch 19. As is illustrated in FIG. 3A, the magnetically-operated switch 19 comprises a terminal 190 with which the magnetically-operated switch 19 is connected to a voltage supply and thus can be put into operation. The signal processing device 20 comprises a measuring resistor 201 that is connected in series to the magnetically-operated switch 19. In particular, this means that the measuring resistor 201 is connected to the output of the magnetically-operated switch 19 with the result that the current that is generated by the magnetically-operated switch flows through the measuring resistor 201. Since the magnetically-operated switch 19 generates a first current or a second current depending upon its state as previously described, the voltage drop at the measuring resistor 201 can assume relative to the magnetically-operated switch 19 accordingly two values depending upon the state of the magnetically-operated switch 19 and consequently upon the position of the permanent magnet. By virtue of measuring the voltage at the measuring resistor 201, which is indicated by the arrow, it is consequently possible to conclude the switched state of the switching device 100.

FIG. 3B illustrates a further development of the signal processing device 20 in accordance with a further exemplary embodiment. In comparison to the previous exemplary embodiment, the signal processing device 20 comprises in a branch parallel to the measuring branch that is formed by means of the magnetically-operated switch 19 and the measuring resistor 201 that is connected thereto in a reference branch a Zener diode 202 that can be connected via a terminal 200 to a voltage supply, said Zener diode generating a reference voltage. A comparator 203 that can be an operational amplifier and can be connected via a further terminal 200 to a voltage supply compares the voltage drop at the measuring resistor 201 with the voltage drop at the Zener diode 202. As illustrated, it can be advantageous if the Zener diode 202 is connected via a resistor 204 to the voltage supply. In particular, the comparator 203 comprises two inputs 2031 and 2032 and the prescribed voltages of the measuring branch and the reference branch are present at said inputs. By virtue of the illustrated arrangement, it is possible to realize that the circuit comprising a magnetically-operated switch 19 and signal processing device 20 operates with an arbitrary supply voltage in a wide range. In particular, the magnetically-operated switch 19, the Zener diode 202 and the comparator 203 can be connected to a common supply voltage via the terminals 190, 200. The supply voltage can preferably provide a voltage that is greater than or equal to 3 V and less than or equal to 24 V. For example, it is possible for the voltage that is provided by the voltage supply to be a vehicle electrical system voltage of a motor vehicle that can be 12 V or 24 V.

The comparator 203 comprises an output 2033, which in dependence upon the voltage at the measuring resistor 201 can assume the as described two values in accordance with the states of the magnetically-operated switch 19, can in comparison to the reference voltage at the Zener diode 202 accordingly adopt two different states. Furthermore, the signal processing device comprises an electronic switch 207 having a control input that is connected to the output 2033 of the comparator 203. It is particularly preferred that the electronic switch 207 can be as illustrated a field effect transistor that is preferably connected to the output of the comparator 203 via a voltage divider that is formed by means of resistors 205, 206. The voltage divider is embodied in such a manner that an unambiguous high and low signal is generated for the control input of the electronic switch 207.

The components of the signal processing device 20 are configured together with the magnetically-operated switch 19 in particular in such a manner that the electronic switch 207 is in an open state, in other words in a blocking state or a state in which it exhibits at least a high resistance, if the switching device is in the non-active switched state, and said electronic switch is in a closed state, in other words conducting state or at state in which it exhibits at least a low resistance, if the switching device is in the active switched state. In short, the electronic switch 207 that is embodied as a field effect transistor consequently exhibits a low resistance if the permanent magnet moves away from the magnetically-operated switch, and it exhibits a high resistance if the permanent magnet moves sufficiently close to the magnetically-operated switch with the result that the electronic switch 207 demonstrates the same behavior as the switching device 100. In particular, the electronic switch 207 behaves in the same manner as a reed switch but without requiring mechanical parts which are necessary in the case of the reed switch.

As illustrated in FIG. 3C, the electronic switch 207 can be connected for example in such a manner that it is possible depending upon the switched state to generate by means of a terminal 208 an output voltage at a voltage source between the terminals 209 or also an output voltage is not present since in the blocking state there is no terminal to ground with the result that the state of the electronic switch 207 can be detected.

The features and exemplary embodiments described in conjunction with the figures can be combined with one another according to further exemplary embodiments, even if not all combinations have been explicitly described. Furthermore, the exemplary embodiments described in conjunction with the figures may alternatively or additionally include further features in accordance with the description in the general part.

The invention is not restricted to the exemplary embodiments by the description on the basis of said exemplary embodiments. Rather, the invention encompasses any novel feature and any combination of features, which in particular includes any combination of features in the patent claims, even if this feature or this combination is not itself explicitly specified in the patent claims or exemplary embodiments.

The invention claimed is:

1. A switching device comprising:
at least one stationary contact;
a movable contact;
an armature;
a permanent magnet; and
a magnetically-operated switch,
wherein the movable contact is movable by the armature,
wherein the permanent magnet is attached to the armature,
wherein the magnetically-operated switch is a Hall switch,
wherein the magnetically-operated switch is connected to a signal processing device,
wherein the signal processing device comprises a measuring resistor directly connected in series to the magnetically-operated switch, and
wherein the signal processing device is configured to detect a state of the magnetically-operated switch.

2. The switching device as claimed in claim 1, wherein the magnetically-operated switch is configured to be in the state selected from a first state and a second state depending on a magnetic field.

3. The switching device as claimed in claim 2, wherein the magnetically-operated switch is configured to generate a first current in the first state and a second current in the second state, the second current being different to the first current.

4. The switching device as claimed in claim 2, wherein the magnetically-operated switch is in the first state or in the second state depending on a distance of the permanent magnet to the magnetically-operated switch.

5. The switching device as claimed in claim 1, wherein the permanent magnet is arranged at an end of the armature remote from the movable contact.

6. The switching device as claimed in claim 1, wherein the armature comprises a magnetic core and a shaft, and wherein the permanent magnet is attached to the magnetic core and/or to the shaft.

7. The switching device as claimed in claim 6, wherein the permanent magnet is a ring magnet arranged symmetrically with respect to the shaft of the armature.

8. The switching device as claimed in claim 1, wherein the at least one stationary contact, the movable contact, the armature and the permanent magnet are arranged within a gas-tight region.

9. The switching device as claimed in claim 8, wherein the magnetically-operated switch is arranged outside the gas-tight region.

10. The switching device as claimed in claim 1, wherein the signal processing device comprises a comparator configured to compare a voltage drop across the measuring resistor with a reference voltage.

11. The switching device as claimed in claim 10, wherein the reference voltage is predetermined by a Zener diode.

12. The switching device as claimed in claim 11, wherein the magnetically-operated switch, the Zener diode and the comparator are connected to a common voltage supply.

13. The switching device as claimed in claim 10, wherein the signal processing device comprises an electronic switch having a control input connected to an output of the comparator.

14. The switching device as claimed in claim 13, wherein the control input of the electronic switch is connected to the output of the comparator via a voltage divider.

15. The switching device as claimed in claim 1, wherein the measuring resistor is configured to measure a voltage with respect to the magnetically-operated switch.

16. A switching device comprising:
a movable contact being movable by an armature;
a permanent magnet attached to the armature;
a magnetically-operated switch being a Hall switch; and
a signal processing device comprising:
a measuring resistor directly connected in series to the magnetically-operated switch;
a comparator configured to compare a voltage drop across the measuring resistor with a reference voltage, the reference voltage being predetermined by a Zener diode; and
an electronic switch having a control input connected to an output of the comparator,
wherein the magnetically-operated switch, the Zener diode and the comparator are connected to a common voltage supply, and
wherein the control input of the electronic switch is connected to the output of the comparator via a voltage divider.

17. The switching device as claimed in claim 16, wherein the measuring resistor is configured to measure a voltage with respect to the magnetically-operated switch.

18. A switching device comprising:
a stationary contact and a movable contact; and
a permanent magnet and a magnetically-operated switch,
wherein the magnetically-operated switch has a first state and a second state and is switchable between the first and second states as a result of a distance of the permanent magnet to the magnetically-operated switch,
wherein the magnetically-operated switch is connected to a signal processing device, the signal processing device being configured to detect a state of the magnetically-operated switch,
wherein the signal processing device comprises a measuring resistor connected in series to the magnetically-operated switch, and
wherein the measuring resistor is directly connected to the magnetically-operated switch.

19. The switching device as claimed in claim 18, wherein the measuring resistor is configured to measure a voltage with respect to the magnetically-operated switch.

* * * * *